Nov. 22, 1960     J. R. ATKINSON     2,961,196
FOLDING WING AIRCRAFT
Filed April 21, 1954     7 Sheets-Sheet 1
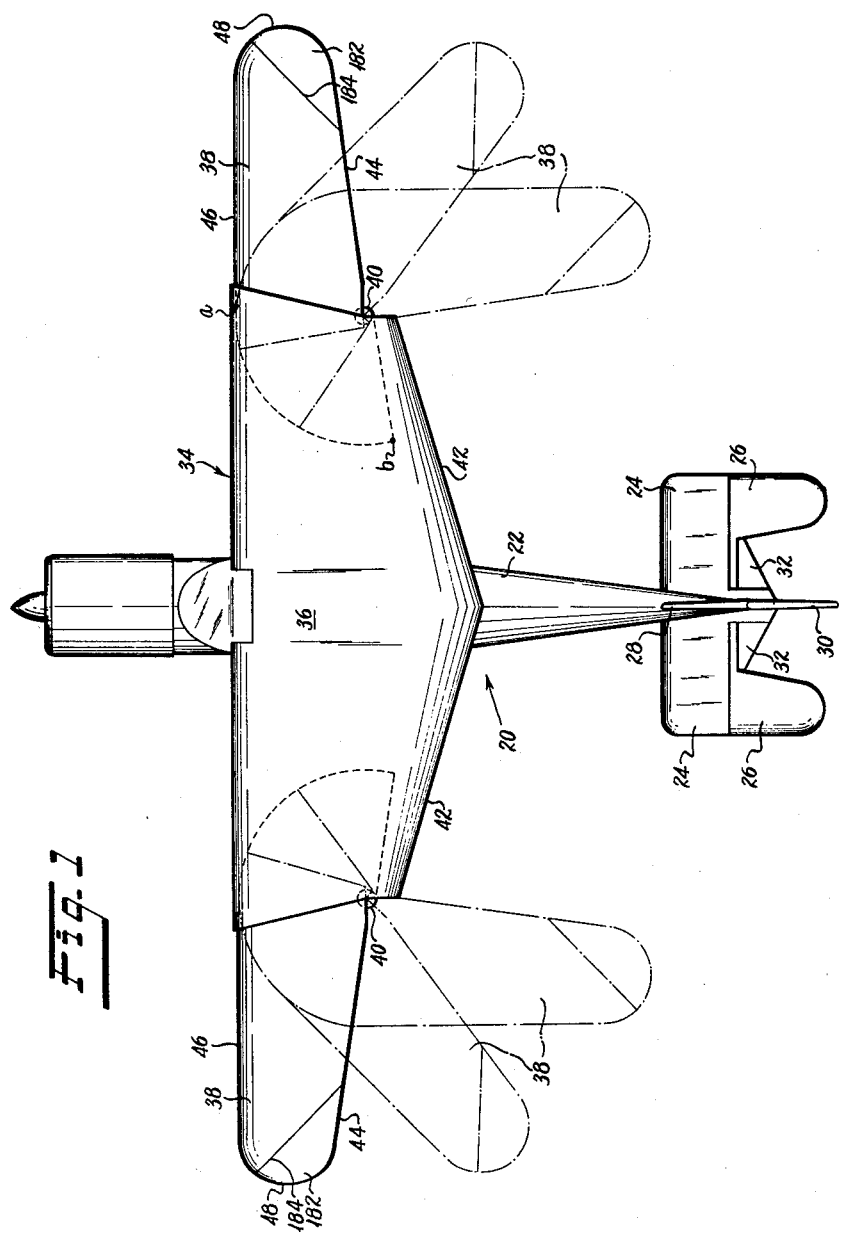
INVENTOR.
JACK R. ATKINSON
BY *Strauch, Nolan & Diggins*
ATTORNEYS Nov. 22, 1960    J. R. ATKINSON    2,961,196
FOLDING WING AIRCRAFT
Filed April 21, 1954    7 Sheets—Sheet 2
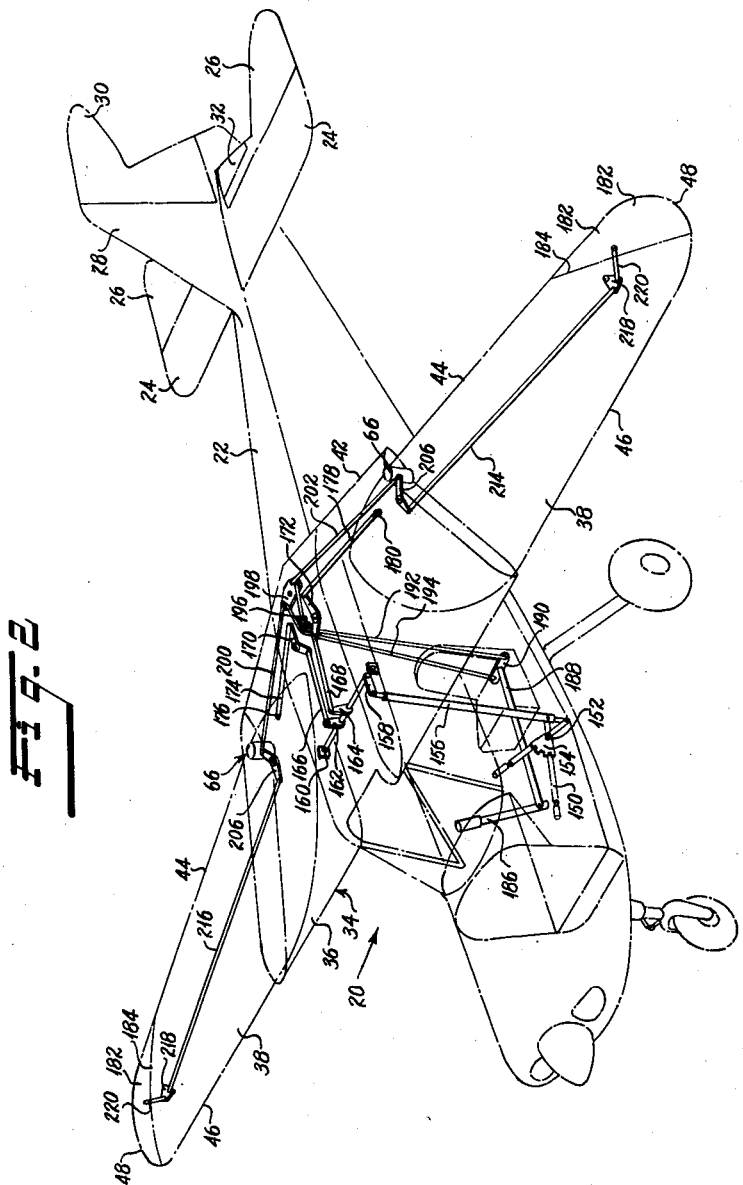
Inventor
JACK R. ATKINSON
By Strauch, Nolan + Diggins
ATTORNEYS

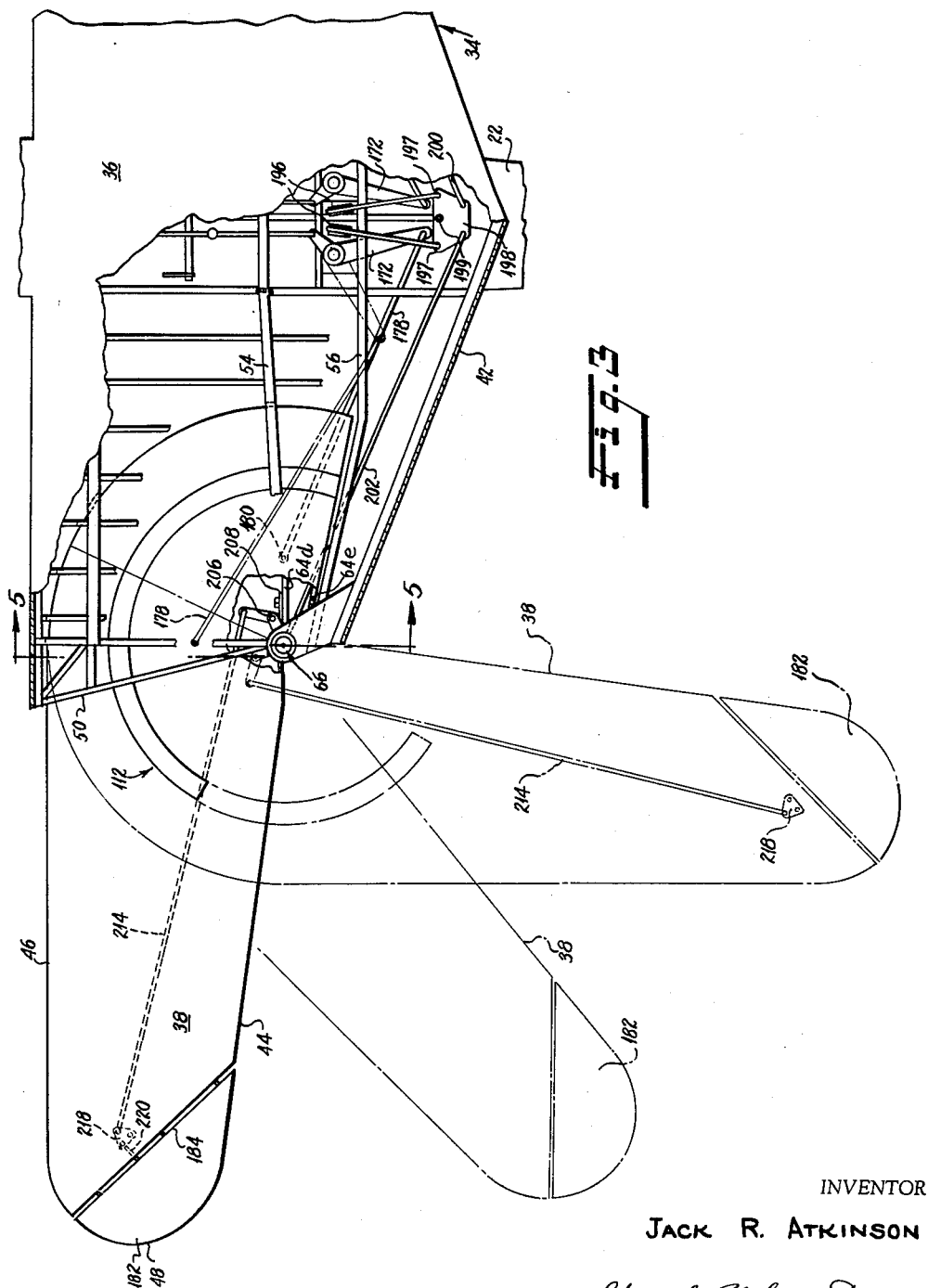

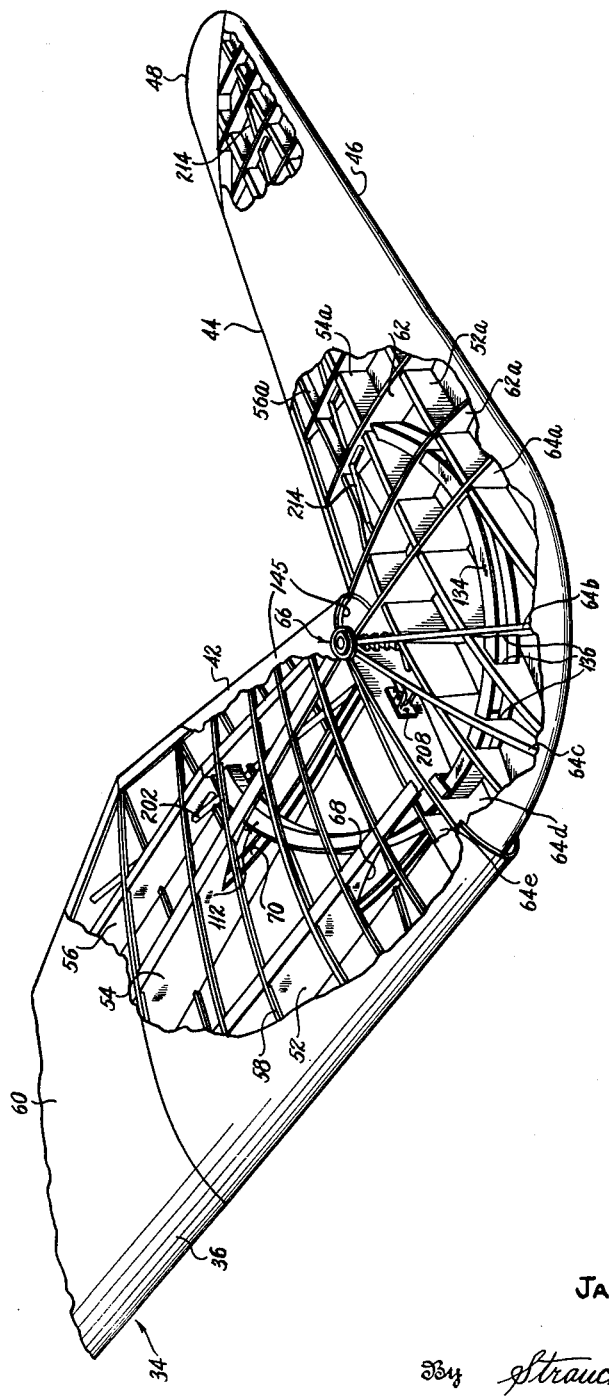

Nov. 22, 1960  J. R. ATKINSON  2,961,196
FOLDING WING AIRCRAFT
Filed April 21, 1954  7 Sheets-Sheet 5
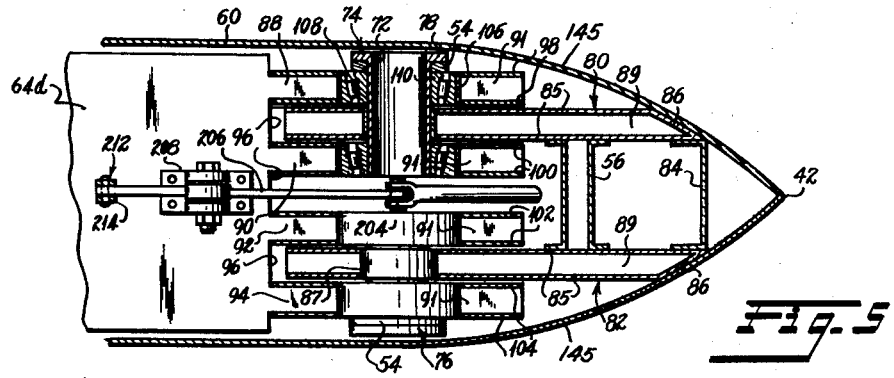
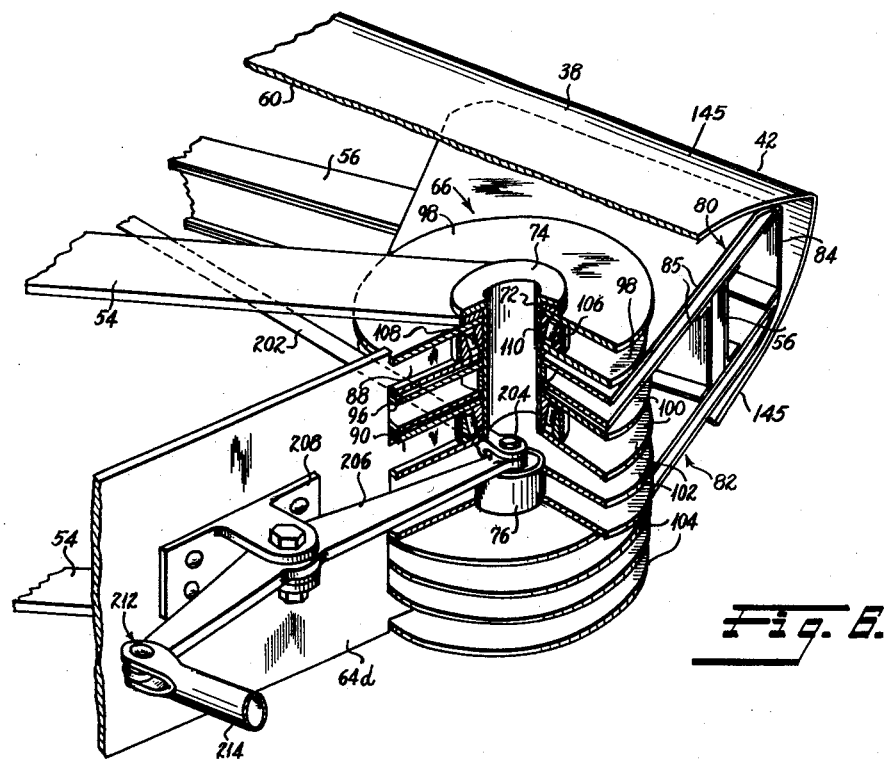
Inventor
JACK R. ATKINSON
By Strauch, Nolan & Diggins
ATTORNEYS

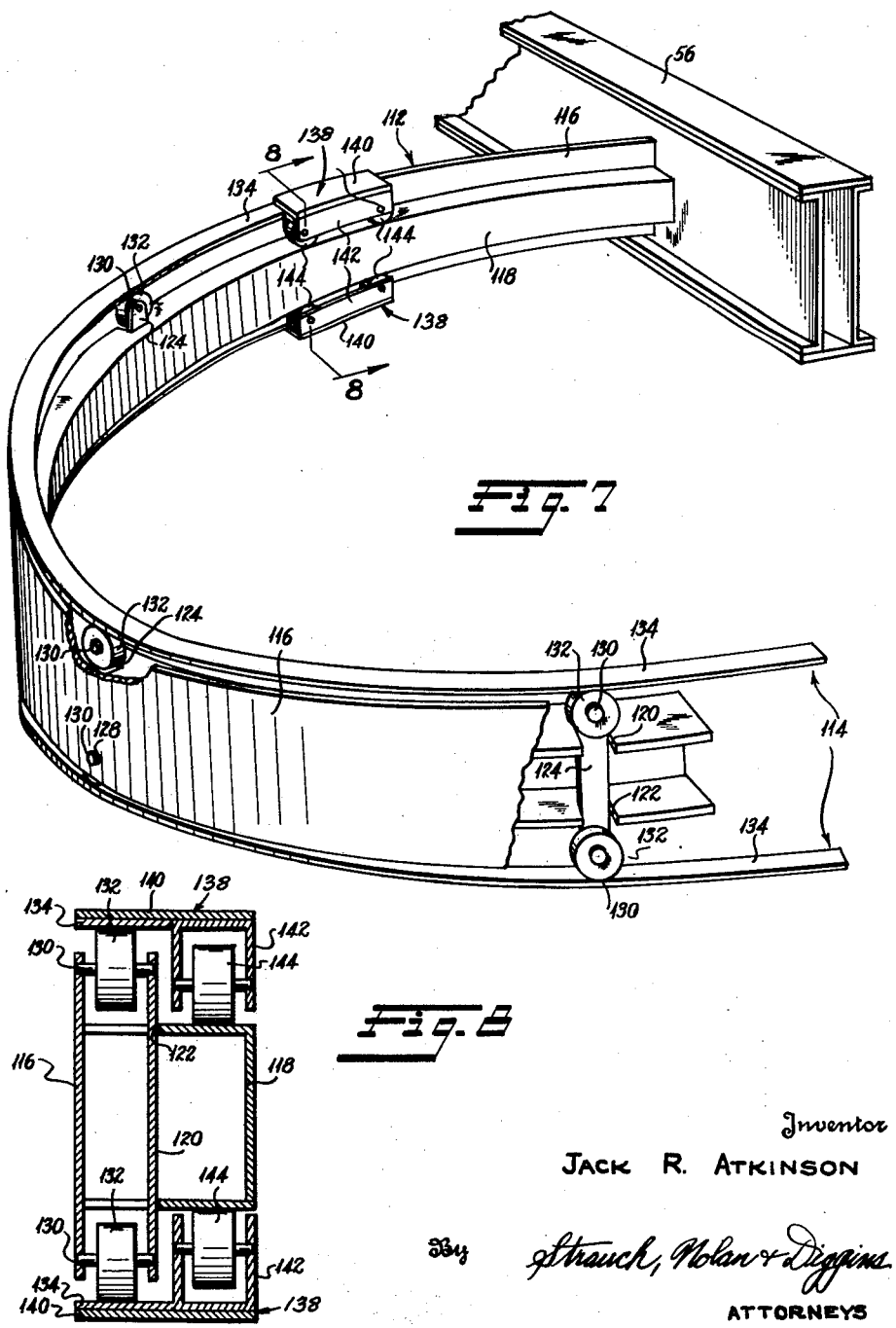

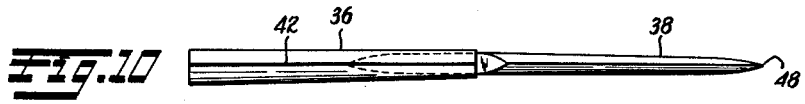
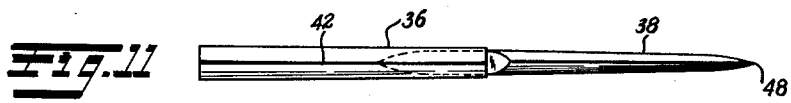
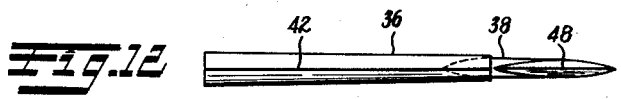
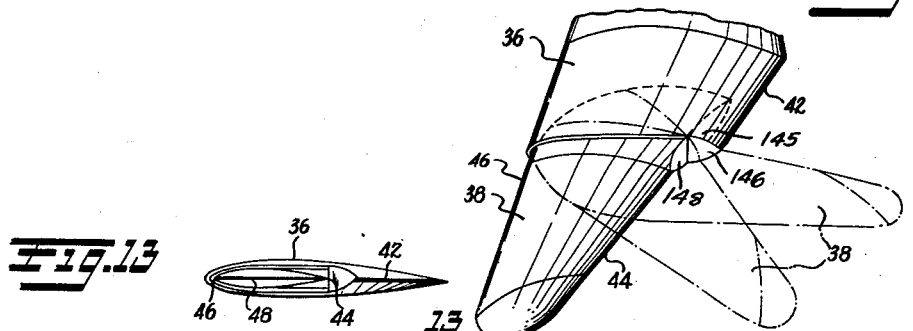
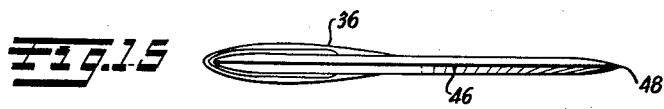

United States Patent Office 2,961,196
Patented Nov. 22, 1960

2,961,196
FOLDING WING AIRCRAFT
Jack R. Atkinson, 14B Fenway S., Baltimore 21, Md.
Filed Apr. 21, 1954, Ser. No. 424,597
8 Claims. (Cl. 244—46)

This invention relates to aircraft of the heavier-than-air type and more particularly to the wing configurations and structure of such aircraft.

Despite the rapid advancements of the science of aeronautics in the fifty years since the first powered flight by a heavier-than-air craft, among the problems still unsolved is that of increasing the range between landing or stalling speeds and maximum cruising speeds. With the advent of jet propulsion power plants and their current widespread use in both military and commercial aircraft, flight speeds have been increased beyond the speed of sound but not without a penalty paid in terms of ever-increasing landing speeds and landing runs. This problem has reached the point where landing speed and landing run requirements have become as important a factor in limiting the cruising speed of a practical aircraft as structural considerations, power requirements, compressibility phenomena, the sonic barrier, and the like.

The problem has its origin in the fact that "lift" on an airfoil increases with speed and, therefore, for a given airfoil section, design wing loading and at a given angle of attack, a wing which provides sufficient lift to support an aircraft at high speed does not provide sufficient lift at low speeds and vice versa. Lift on the airfoil is increased by changing the attitude of the aircraft so as to increase the angle of attack but any attempt to increase the angle of attack enough to provide sufficient lift at lower than design speeds results in stalling and consequent break down of airflow and substantially complete loss of lift with disastrous results.

Attempts to solve this long standing problem have approached it from many angles. Retractible flaps, wing slots and other high lift devices have been used with varying degrees of success to raise the angle of attack at which stalling occurs. Such devices, however, are limited in their application because the air flow disturbance caused thereby is undesirable at high speeds. Even where they are used, their effectiveness is limited as attested by the fact that even with flaps, landing speeds far in excess of one hundred miles per hour are common in modern aircraft.

Another approach to the problem has been to cut down the landing run rather than the landing speed by the use of such devices as parachute brakes and, as on aircraft carriers, with arresting hooks and cables. These devices, however, avoid rather than solve the problem and theirs is only a partial effectiveness, limited by the physical stress imposed on the aircraft and its occupants. The rapid deceleration of arresting hooks and cables is particularly undesirable.

From the relatively early stages of aircraft development, attempts also have been made to solve these problems by utilizing supporting wings in which various structural and/or aerodynamic characteristics were adjustable, for example, camber, span, area, aspect ratio, dihedral angle, sweep back angle and the like but despite the many proposals, none have proved effective and feasible in practice as attested by the fact that conventional present day aircraft still have fixed wings (except for the foldable wings used to facilitate storage, for example, of aircraft-carrier based planes).

With the foregoing problems and state of the art in view, the present invention contemplates in its broadest aspects an aircraft, having outboard wing sections which can be selectively pivoted forwardly and rearwardly, with respect to the line of flight, to and from a normal or conventional position in which they are substantially perpendicular to the vertical plane of symmetry of the aircraft fuselage and an extreme swept-back position in which they are substantially parallel to said plane of symmetry and to any intermediate position.

The type of wing contemplated by the invention is hereinafter referred to as a "Vernontagrade" wing or simply a "V-wing." The term "Vernontagrade" is derived from a combination and contraction of the Latin words "verto" (turn), "nontaginta" (ninety), "gradius" (degree), that is, "turn ninety degrees" which describes the action of the wing.

A fundamental object of the invention is to provide aircraft generally improved with respect to flight stability, power requirements at maximum cruising speeds and characterized by an unusually high ratio of maximum cruising to landing or stalling speed.

Another object is to provide novel aircraft wings which are adjustable, in flight or at rest, to vary their structural configuration, viz., span, area, and sweep-back as well as their aerodynamic characteristics, viz., wing loading and lift and drag coefficients and ratios at any given angle of attack.

Still another object of the invention is to provide novel aircraft supporting wings having outboard sections of substantial span which may be adjusted to a sweep-back angle from 0 to 90° while in flight.

A further object is to provide novel structure for articulated aircraft wings providing relative pivotal movement between the segments wherein there is no substantial loss of structural strength and rigidity and no substantial discontinuity in the active wing surface due to such articulation and pivotal movement.

A more specific object is to provide novel aircraft wings having outboard sections of substantial span secured to the inboard sections for pivotal movement relative thereto about axes substantially perpendicular to the plane of flight and means operable in flight for selectively pivoting said outboard wing sections to achieve an angle of from 0 to 90 degrees, inclusive, between the spanwise axes of the inboard and outboard sections.

Another object of the invention is to provide, in a vernontagrade wing as characterized by the foregoing objects, a novel aileron configuration whereby the control effectiveness of the aileron surfaces is retained in all positions of wing sweepback.

Still another object is to provide, in a vernontagrade wing as characterized by the foregoing objects, a novel aileron control linkage, the operation and sensitivity of which is unaffected by changes in wing sweepback.

These and subordinate objects, the manner of their attainment and the many advantages of this invention will be readily apparent to those conversant with the art from a reading of the following description and subjoined claims in conjunction with the annexed drawings in which:

Figure 1 is a top plan view of a high-wing monoplane embodying the present invention;

Figure 2 is a perspective view of the aircraft shown in Figure 1;

Figure 3 is top plan view on an enlarged scale, of the port side span of the aircraft shown in Figure 1 with portions of the wing covering removed to show internal structure, Figure 4 is a fragmental perspective elevation of the port-side wing span of the aircraft of Figure 1, with the outboard section fully swept back and portions of the wing covering removed to show details of the internal wing structure;

Figure 5 is a sectional view substantially on line 5—5 of Figure 3 showing details of the hinge connection between the stationary inboard or base wing section and the pivotal outboard wing section;

Figure 6 is a fragmental perspective elevation partly in section of the hinge structure shown in Figure 4 and associated parts of the structure of outer end of the base wing section;

Figure 7 is an enlarged detail view of the cooperating structural members for guiding and supporting the pivotal wing section relative to the fixed or base wing section;

Figure 8 is a sectional view on line 8—8 of Figure 7 looking in the direction of the arrows and with the relatively movable parts displaced to a position different from that shown in Figure 6 in order to simplify and elucidate the sectional view;

Figure 9 is a partial perspective elevation showing the port-side span of a vernontagrade wing with the pivotal wing section in fully extended position (solid lines) and in sweepback positions of approximately 45° and 90° (broken lines).

Figures 10, 11 and 12 are eleavtional views of the vernontagrade wing shown in Figure 9, looking toward the trailing edge, with the pivotal wing section in 0°, 45° and 90° sweepback positions, respectively; and Figures 13, 14 and 15 are elevational views of the vernontagrade wing shown in Figure 9, looking into the wing tip, as indicated by arrows 13—13 on Figure 9, with the pivotal section in 0°, 45° and 90° sweepback positions, respectively.

Referring now to Figure 1, the vernontagrade wing contemplated by the invention is shown as applied to an otherwise typical, high-wing monoplane type light aircraft 20, comprising the customary fuselage 22, horizontal stabilizers 24, elevators 26, vertical fin 28, rudder 30 and trim tabs 32. The wing 34 is an example of the novel vernontagrade wing contemplated by the invention and comprises a base wing section 36, fixedly secured to fuselage 22 in any suitable manner, and having movable outboard sections 38 pivotally secured thereto in a manner hereinafter described.

Base wing section 36 may be formed of any conventional or novel profile section or a number of different sections, varying along the span. In addition, the base wing section may be swept-back; may have positive, negative or zero dihedral; and may have any desired plan configuration or pattern. These factors will be controlled primarily by the usual considerations arising out of the particular aircraft being designed and do not play any part in the present invention except insofar as the configuration of the outboard portions of the base wing may be controlled by structural considerations arising from the mounting requirements of the pivotal sections 38 as will be apparent as the description proceeds.

As clearly shown in Figures 1 and 3 the inboard ends of movable wing sections 38 are pivotally secured, as at hinge axes 40, to the respective outer ends of the base wing section 36, the hinge axes being located adjacent the trailing edge 42 of the base wing and the edges 44 of the wing section 38 which are the trailing edges of the pivotal wing sections when they are extended as shown in full lines in Figure 1. Considering wing section 38 in their full line (extended) positions, the inboard portions of each edge 46 (which is the leading edge in this position) is defined by a circular arc of somewhat greater than 90° having its center on the respective hinge axes 40 and extending from point "a" where it merges with leading edge 46 to a point "b" which is determined by various structural considerations as hereinafter appears. Inasmuch as the wing 34 is symmetrical about the vertical plane of symmetry of the fuselage 22, the remainder of this description will be confined primarily to one half, viz., the port-side span, of the wing.

In order to avoid confusion in nomenclature resulting from the fact that, for example, edge 46, which is the leading edge of wing section 38 with this section extended, becomes the wing tip when the section 38 is in fully swept-back position, the following nomenclature will be adhered to in the remainder of the description:

Edge 46 will be referred to as the leading edge of section 38; edge 48 as the wing tip edge; 44 as the trailing edge; and chord lines from the arcuate portion a—b of leading edge 46, which lines pass substantially through the hinge axis 40, will be called "radial chords." Additional specific nomenclature will be given as the description progresses.

Still referring to Figures 1 and 3, it will be seen that the outer end portion of base wing 36 terminates abruptly as at 50, which is hereinafter called the terminal chord of the base wing or intermediate span. Terminal chord 50 is inclined (at 15° in the present embodiment) with respect to the remaining (inboard) base wing chords which are parallel to the centerline of fuselage 22. The outboard end of base wing 36 is open and the internal structure thereof so arranged, as will presently appear, that the inboard portion of pivotal wing section 38 is telescopically received therein permitting the wing section 38 to be moved pivotally about hinge axis 40 to assume an extended position (solid lines, Figure 1), a ninety degree sweep back position (broken lines), and any intermediate position represented by a showing of the wings at a 45° sweep-back (also in broken lines).

Hereinafter, the portion of wing section 38 bounded by radial chords a–40, b–40 and arc a—b will be referred to as the "radial" portion of this wing section.

It will be appreciated by those skilled in the aeronautical arts and sciences that the specific aerodynamic characteristics, for example, the profile, span, aspect ratio, etc., of an aircraft supporting wing stems from the designer's judgment and prudent considerations of the requirements of the particular type of aircraft for which the wing is intended. Inasmuch as the general concept underlying the present invention can be applied to any type of aircraft and aircraft wing, before describing a particular, preferred structural embodiment which illustrates one specific application of the invention, the broad inventive principles will now be explained.

As already broadly described, the Vernontagrade wing comprises a stationary inboard section or sections fixed to the aircraft fuselage and pivotally movable outboard sections. In this regard, it will be understood that, if the aircraft is of a type, for example a high wing monoplane such as illustrated in Figures 1 and 2, having a single continuous wing span, the inboard section will in most cases be a single unit fixed transversely of and having its span symmetrically distributed on each side of the vertical plane of symmetry of the fuselage. On the other hand, if the aircraft is, for example, a mid-wing monoplane, the wing will, of course, have a divided span consisting of two identical sections, each comprising an inboard or base wing section fixedly secured to, and extending outwardly from the fuselage and movable outboard section pivotally secured to the base wing section.

Generally, in calculating the total area of the supporting wing and the relative areas of the fixed and movable sections, the areas may be computed on the basis of one-half the base wing and one pivotal section and then doubled or on the basis of the whole base wing and two pivotal sections.

In the following discussion the presence of the aircraft fuselage will be disregarded, i.e., the effect of the fuselage on the wing area and aerodynamic characteristics will not be taken into account inasmuch as this is constant and the same as in conventional wings. Thus, the following procedure for applying the invention to the layout of a wing deals with the wing only and treats it as if it had a single uninterrupted and effective span from the fuselage center line out to one tip. In the nomenclature, "extended" position is used to designate the position in which the base wing and pivotal section are substantially in spanwise alignment. It will be understood that since the invention may be applied to aircraft in which the base wing has a fixed sweep-back angle, the sweepback angles hereinafter referred to are merely indicative and not absolute and are measured relative to the spanwise axis of base wing rather than to a line perpendicular to the vertical plane of symmetry of the aircraft fuselage. Thus, although the pivotal wing is "extended" and the sweep-back angle measured between the spanwise axes of the fixed and movable sections is zero, these spanwise axes are not necessarily perpendicular to a vertical plane through centerline of the fuselage. Furthermore, the pivotal wing section in its "extended" position may have a fixed minimum angle of sweep back relative to the spanwise axis of the base wing and in its "90°" or full sweep back position may form an angle of less than 90° with the spanwise axis of the base wing section if, for example, this base wing section has a fixed amount of sweep back to start with.

As is customary, the basic wing form is arrived at by the usual trial and error methods taking into account the gross weight of the aircraft, the cruising speed and wing loading desired and the power plants which are suitable and available for use in the aircraft. Having arrived at a basic, conventional wing design having the desired span and other aerodynamic characteristics, the next step in the application of the invention is deciding relative span lengths of the wing which are to be fixed and movable. Usually more than 50% of the total wing span (i.e., 25% on each side) will turn and this can serve as a starting point for rough calculations of performance which can be progressively refined by trial and error.

As best appears in Figure 1, as the pivotal wing sections 38 are moved progressively from the minimum to maximum sweep-back positions, the radial portions of these pivotal wing sections telescoped within the base wing in the extended position are gradually withdrawn therefrom thus increasing the total active wing area. The wing span is, of course, decreased. Arbitrarily selecting the points at which the wing span pivots, the difference in effective wing area, S, for all positions of the pivotal wing sections can be computed mathematically and/or with a planimeter, depending on the geometrical plan configuration of the wing.

The percentage amounts by which the span and areas change depends upon the spanwise location of the hinge axis 40 and the pattern of the wing, primarily its mean chord length and total normal span. In the exemplary embodiment disclosed herein, the following variations were effected as the angle of sweepback was increased.

| Δ Angle of Sweepback | Δ Span (Approximate), percent | Δ Area (Approximate), percent | Δ Wing Loading (Approximate), percent |
|---|---|---|---|
| 0°–45° | −10 | +7½ | −6½ |
| 45°–90° | −26 | +7 | −6½ |
| 0°–90° | −36 | +14½ | −13 |

While the area of the wing increases as the pivotal sections are swept back, these sections are progressively moved to positions of lesser aerodynamic effectiveness, as hereinafter more fully explained, and consequently the lift exerted thereby and, therefore, the total lift of the wing is decreased, despite the increase in wing area. The extent to which this change in lift occurs is affected by the percentage change in span but basically and more important it depends on the airfoil sections constituting the pivotal portions of the wing and the change in aerodynamic characteristics of these sections as they are turned at progressively greater angle to the direction of flight. In the 90° positions, the pivotal sections 38 are turned so that their spans are substantially parallel to the airflow and the lifting shapes defined by the airfoil sections thereof are turned at 90° to the airflow. While the axial sectional configuration of the pivotal wing sections 38 is such that it presents a streamlined shape to the airflow when turned to full sweepback and may, if desired, be formed so as to create a given amount of lift in this position, this lift must necessarily be less than in the extended position.

Although the specific percentage variations in lift coefficient can only be roughly estimated by theoretical calculations, reliable data can be obtained empirically from wind tunnel tests and in the exemplary embodiment presently under consideration, the following variations in lift coefficient, in level flight attitudes were manifested:

| Δ angle of sweepback: | Δ CL, percent |
|---|---|
| 0°–45° | 16 |
| 45°–90° | 27 |
| 0°–90° | 39 |

In the same exemplary V-wing construction the total drag decreased directly as the sweep-back angle is increased as shown in the following tabulation:

| Δ angle of sweepback: | Δ $C_D$, percent |
|---|---|
| 0°–45° | 16 |
| 45°–90° | 26 |
| 0°–90° | 39 |

The following tabulation of data shows the effect of the foregoing variations in lift and drag were reflected in vastly improved performance estimates of the exemplary aircraft to which it is applied as shown by the following tabulation:

| Δ Angle of Sweepback | Δ Cruising Speed at Maximum Efficiency, percent | Δ Top Speed at Maximum Efficiency, percent |
|---|---|---|
| 0°–45° | +5.93 | +9 |
| 45°–90° | +13.6 | +16 |
| 0°–90° | +21.0 | +26 |

In addition, the ratio of cruising speed to landing or stalling speed of the exemplary aircraft being described is 3:1 as compared with 2.51:1 for such an aircraft without the vernontagrade wing.

Having thus explained the broad underlying concept of the invention, a specific exemplary structure for carrying out this concept will be described with continued reference to the drawings and first, particularly to Figures 3 and 4.

General V-wing structure

Base wing 36 comprises, as its primary structural members, three spanwise extending spars: a forward spar 52, a center spar 54 and a rear spar 56 structurally interconnected in any suitable manner to a plurality of chordwise forming ribs 58. These spars and ribs form the frame of base wing 36 which is covered with metal or fabric skin 60 to form the aerodynamically active wing surfaces, as well known in the art.

The basic structural members of the pivotal wing sections 38 are three rib-like spars 52a, 54a, and 56a corresponding to and, when the pivotal wing section is extended, in substantial alignment with base wing spars 52, 54 and 56, respectively. As clearly shown in Figure 4, each of the spars 52a, 54a, and 56a have generally airfoil-type or streamlined contours, the specific configurational requirements of which will hereinafter be described in greater detail.

In the portion of pivotal wing section 38 bounded by leading and trailing edges 46 and 44, respectively, spars 52a, 54a and 56a are intersected by and interconnected to a plurality of substantially parallel forming ribs 62 extending between said leading and trailing edges. Ribs 62 are of a shape to give wing section 38 an airfoil contour in sections taken transversely of spars 52a, 54a and 56a and, in the present embodiment, the ribs decrease in chord length and thickness toward the wing tip 48, although this is a matter of choice.

The rib 62 most remote from wing tip 48 is designated 62a and has its trailing edge portion located at the juncture of base wing trailing edge 42 with the trailing edge 44 of pivotal wing section 38 when the latter is in the maximum sweep back position as shown in Figure 4. The frame of the radial portion of wing section 38 is formed by a number of ribs 64a, 64b ,64c and 64d extending radially from hinge axis 40 and intersecting and suitably interconnecting with spars 52a, 54a, and 56a. The inner most rib 64e extends roughly tangential to hinge axis 40. As hereinafter described in detail, hinge axis 40 is defined by a hinge assembly 66 which pivotally interconnects the principal structural members of the base wing 36 and pivotal wing section 38.

From the structure thus far described it will be seen that ribs 62 are of such contour as to give wing 38 an airfoil section transversely of spars 52a, 54a and 56a. This airfoil section is such that, when the turning wing section 38 is extended, it forms a smooth, substantially uninterrupted continuation of the base wing 36, with respect to chord length, thickness, taper (if any), wash out (if any), etc. Ribs 64a—64e are complementary in shape and very slightly smaller than the outermost ribs 58 of base wing 36 so as to telescope thereinto with a minimum of clearance when wing section 38 is extended. At the same time these ribs 64a—64e and spars 52a, 54a and 56a are so formed that the wing section 38 presents a suitable streamline shape to the airflow at any position of adjustment.

Referring again to Figure 4, the outermost ends of forward spar 52 and center spar 54 of base wing 36 are bifurcated so as to define openings 68 and 70, respectively, therein, of suitable size and shape to accommodate passage of the radial portion of turning wing section 38 as it telescopes into the base wing.

The extreme outboard end of each of the legs of the bifurcated end of spar 54 contains an aperture (one shown at 72, Figure 5), the apertures in the respective legs of the spar being coaxial with and serving to define hinge axis 40 of hinge assembly 66.

*Hinge assembly*

Hinge assembly 66 comprises a pair of identical hollow hinge pins 74 and 76 which are press fitted into the respective apertures 72, from the top and bottom sides of spar 54, respectively. Pins 74 and 76 have flanged or otherwise suitably enlarged outer ends 78 which abut the corresponding surfaces of spar 54 around apertures 72 to limit the inward movement of the pins when they are installed. Pins are preferably formed of a high-tensile strength alloy in order to withstand the stresses exerted thereon under flight conditions. The inner ends of the hinge pins are spaced from each other in order to allow installation and operation of a novel aileron control linkage as hereinafter explained. The pins are hollow to permit connection of and adjustments to this linkage and secondarily to decrease weight.

The hinge assembly further comprises a pair of fixed hinge members 80 and 82 secured, in any suitable manner such as welding, to the top and bottom surfaces, respectively, of rear spar 56 and to a channel member 84 adjacent trailing edge 42 of base wing 36. Hinge members 80 and 82 may be castings or be fabricated from sheet metal, the latter, preferred because of lightness in weight being illustrated in this exemplary embodiment. When fabricated of sheet metal, each of these hinge members takes the form of a pair of parallel plates 85 joined adjacent trailing edge 42 by a web 86 and at their opposite ends by a bushing 87 pressed or shrink fitted into suitable apertures in the plates. Bushings 87 are coaxially aligned with apertures 70 and adapted to receive, with a snug fit, the respective hinge pins 72 and 74. From the structure thus far described it will be seen that the hinge pins are rigidly and strongly supported by and structurally interconnected to the primary structural members of the frame of base wing 36, i.e., the upper and lower ends of pins 72 and 74, respectively, are directly secured to and mounted on the outboard end of spar 54 while the mid-shank portions of the pins are tied to rear spar 56 by means of fixed hinge parts 80 and 82.

The turning wing section 38 is tied into the hinge assembly by discoid hinge members connected to the radially inner ends of radial ribs 64a—64d and tangential rib 64e as will now be described. The inner ends of each of these ribs are formed with a number of tongues 88, 90, 92 and 94 spaced by intermediate notches 96. The corresponding tongues on each of the radial ribs 64a, 64b, 64c, and 64d, tangential rib 64e extends radially and tangentially, as the case may be in between and are, in this position, secured to a corresponding pair of flat annular discs 98, 100, 102 and 104. For example, referring to Figure 6, the uppermost tongue 88 of radial rib 64d, and the uppermost tongues 88 (not shown) on tangential rib 64e and each of the remaining radial ribs are secured between and to discs 98, the next lower tongues (90) on all of the ribs 64a, 64b, 64c, 64d and 64e extend between and are secured to the next lower pair of discs (100), etc. As clearly appears in Figures 5 and 6, the tongues 88, 90, 92 and 94 are so located that, when the hinge parts are assembled, hinge member 80 is disposed between upper disc pairs 98 and 100 while hinge member 82 is disposed between lower disc pairs 102 and 104. The ends of hinge members 80 and 82 remote from trailing edge 42 are suitably rounded so as to be accommodated within spaces 96 so as not to interfere with the relative rotary motion of the hinge parts.

Annular discs 98, 100, 102 and 104 contain coaxially aligned central apertures, each pair of discs having the outer race 106 of a suitable combination thrust and antifriction bearing 108 pressed into their respective apertures. The inner races 110 of bearings 108 are fitted to the respective hinge pins 72 and 74 thus providing an easy turning joint having neither axial nor radial play or looseness.

Suitable spacing and reinforcing webs 89 and 91 are provided between plates 85 and disc pairs 98, 100, 102 and 104.

From the structure thus far described it will be seen that hinge pins 72, 74 and hinge members 80, 82 are fixed relative to the base wing 36 and therefore may be considered the stationary parts of the hinge assembly while discs 98, 100, 102 and 104 are fixed to and turn with the pivotal wing section 38. Bearings 106 provide the antifriction connection between the fixed and movable hinge parts and absorb both radial and axial (thrust) loads on the hinge assembly.

Referring now to Figures 4, 7 and 8, the radial portion of turning wing section 38 is guided and supported in its turning movement relative to base wing 36 by means of a roller and track assembly now to be described.

*Roller and track assembly*

This assembly comprises two primary structural components: a track member 112 which is fixed with respect to base wing 36 and is therefore hereinafter referred to as the "fixed track" and a pair of track members 114 which are fixed to and move with the turning wing section 38 and are, therefore, hereinafter called the "movable tracks."

Fixed track 112 is preferably made up of a symmetrically curved metal plate or band 116 having its center of curvature on hinge axis 40 and having a similarly curved channel member 118 secured to its inner surface between its top and bottom edges as best appears in Figures 7 and 8.

Track 112 has one end suitably fastened to rear spar 56, extends through spaces 70 and 68 in spars 54 and 52, respectively, and terminates adjacent the terminal chord 50 at the open end of base wing section 36.

As shown in Figure 8, channel member 118 of fixed track 112 is provided at spaced points with aligned notches 120 and 122 in its upper and lower walls, respectively. In each pair of these notches is secured by any suitable means a roller support strut 124, the upper and lower ends of which contain apertures (one shown at 126, Figure 7) registering and cooperating with suitable apertures (one shown at 138, Figure 7) in plate 116 to journal the ends of the axle shafts 130 of a number of rollers 132.

As most apparent in Figure 8, each of the rollers 132 is located closely adjacent the plate 116 leaving the innermost portions of the upper and lower walls of channel member 118 unobstructed to allow passage of additional rollers as hereinafter described.

Still referring to Figures 4, 7 and 8, movable tracks 114 each consist basically of a flat strip of metal 134 symmetrically curved about hinge axis 40 as a center. Metal strips 134 are substantially identical in configuration and are secured in spaced parallel relation in wing section 38, each having one end suitably secured to spar 54a; extending through suitable apertures 136 in rib 62a, radial ribs 64a and 64b, spar 54a, radial rib 64c, spar 56a, radial rib 64d and tangential rib 64e; and terminating at rib 64e. Track strips 134 are approximately one-half as wide as the top and bottom walls of channel member 118 and are so spaced and located with respect to their radial distance from hinge axis 40 that the upper and lower track strips 134 are disposed in rolling engagement with the top and bottom rollers 132 of fixed track 112.

The ends of track strips 134 adjacent radial rib 64a are each provided with a roller bracket assembly 138 each of which consists of a flat plate 140 secured, as by welding to the top and bottom surfaces, respectively, of the upper and lower track strips 134. Plates 140 are approximately twice as wide as the track strips 134 and therefore overhang the inner portion of channel member 118 as shown in Figure 8. To this overhang of each of plates 140 is secured a U-sectioned member 142 having its open side facing channel member 118 and having a roller 144 rotatably journalled in each end for rolling contact with the respective top and bottom surfaces of channel member 118. As best seen in Figure 8, the rollers 144 are disposed radially inwardly of rollers 132 and therefore the rollers pass each other without interference during relative movement of the fixed and movable tracks.

From the foregoing description it will be appreciated that the tracks 112 and 114 are guided and supported by rollers 132 and 144, for telescoping movement as the wing section 38 is turned relative to the base wing 36. The coaction of the hinge assembly 66 and the track and roller assembly is such as to rigidly support the turning wing section 38 in all positions of adjustment so as to eliminate the possibility of wing tip flutter, even at high speeds.

The limiting positions of inward and outward telescoping movement of the radial portion of turning wing section 38 may be established by various means. To this end, in the illustrated embodiment, the outermost few of the forming ribs 58 of the base wing are modified from the basic inboard airfoil sections to product a somewhat thickened or rounded trailing edge 145 adjacent the terminal chord 50. The trailing end of tangential rib 64e is similarly thickened or rounded thus producing a pair of enlarged, flattened areas 146 and 148 (see Figure 9) which are at approximately right angles to each other when turning wing section 38 is fully extended and are in mating abutment when the wing section 38 is fully swept back. This enlargement and rounding of the trailing edges also serves to accommodate the hinge assembly 66 and permits optimum fairing of the juncture between trailing edge 42 and nominal trailing edge 46 when the wing section 38 is at the maximum sweepback position. It will, of course, be understood that the outboard end of base wing 36 and the radial portion of wing section 38 are so dimensioned that they remain partially telescoped even at full sweepback.

The inward telescoping movement of radial portion of wing section 38 is limited by abutment of the inner face of tangential rib 64e with the forward surface of rear spar 56. As will be seen as the description proceeds the extreme limit positions of the turning wing section 38 as well as any desired number of intermediate positions are also defined by locks or stops associated with the mechanism for controlling the amount of sweepback.

*V-wing control systems*

The position of wing section 38 may be adjusted while in flight by various means, for example, by a direct mechanical linkage, electric or fluid motors, or, if desired the wings may be positioned automatically in response to the air speed of the aircraft.

In Figure 2 a direct mechanical linkage is shown. This comprises a control lever 150 pivotally mounted as at 152 in any convenient position within the pilot's compartment of the aircraft. A suitably notched quadrant 154 mounted adjacent pivot 152 cooperates with a suitable spring-pressed pawl or detent mechanism (not shown) associated with lever 150 to lock it in preselected pivotal positions. Any reasonable number of locking positions may be provided by the quadrant notches or an infinite number of locking positions may be obtained by replacing the detent stops with a friction-type lock.

Control lever 150 is pivoted intermediate its ends so as to give the required leverage or mechanical advantage, the short end of the lever being pivotally connected to the lower end of a connecting rod 156 having its upper end pivotally attached to one end of a radial arm 158, the other end of which is fixedly secured to a coordinating shaft 160.

The ends of coordinating shaft 160 are journalled in the frame of base wing 36 so that it is rotatable about its axis, which runs approximately perpendicular to the vertical plane of symmetry of the aircraft. Fixedly secured to the mid-portion of shaft 160 are a pair of radial lever arms 162 and 164. The free end of each arm 162 and 164 is pivotally connected to one end of a link rod 166 and 168, respectively. The opposite ends of link rods 166 and 168 are pivotally secured, respectively, to respective arms of a pair of bell cranks 170 and 172, mounted within base wing 36 for pivotal movement about axes generally perpendicular to the plane of the base wing. The other arm of bell crank 170 is pivotally connected to the inboard end of a push-pull rod 174 which extends through suitable clearance apertures in the wing frame into the starboard half of base wing 36 and has its outboard end pivotally secured as at 176 to the frame structure, for example rib 64d of the radial portion of the starboard side turning wing section 38.

Similarly the other arm of bell crank 172 is pivotally connected to the inboard end of a push-pull rod 178 which extends spanwise into the port side of base wing 38 and has its outboard end pivotally connected as at 180 to the frame structure of the radial portion of the port side turning wing section 38.

From the foregoing description, it will be understood that adjustment of the V-wing in flight is accomplished by this mechanical linkage in the following manner:

The initial position of turning wing section 38, for example, at take-off, usually would be fully extended as shown in Figure 2, in which case the control lever would be locked in its solid line position. As the aircraft becomes airborne and approaches operational flight-speeds, the dynamic pressure of the air exerts a considerable force on the leading edges 46 tending to move wing sections 38 rearwardly. This puts rods 174 and 178 in tension which tension tends to rotate bell cranks 170 and 172 counter-clockwise and clockwise, respectively, as viewed from above, tending to move links 166 and 168 rearwardly, connecting rod 156 upwardly and to pivot control lever 150 forwardly. Therefore, to adjust the wing sections 38 to a swept back position, the pilot grips control lever 150 and, while exerting a backward pull thereon to prevent abrupt forward movement, disengages the lock and gradually eases his rearward pull, allowing the air pressure to pivot the wing sections 38 rearwardly until a desired position is obtained, whereupon the lock for control lever 150 is once again engaged to maintain the adjustment. Inasmuch as the control mechanism is comprised entirely of rigid links, neither forward nor rearward movement of the turning wing sections 38 is possible while the control lever 150 is locked.

To move the wing section toward the extended position, the pilot, while exerting a rearward pull on lever 150 (unless the wing sections are in their full-sweep back position in which case this obviously would not be necessary) releases the lock mechanism, and pulls back on the lever. This moves rods 156 downwardly, links 166 and 168 forwardly and rods 174 and 178 inwardly thus pivoting wing sections 38 toward the extended position. The coordinating rod 160 assures joint and equal movement of both turning wing sections. Suitable adjustments, for example, in the effective length of rods 166 and 168 and/or 174 and 178 and/or in the relative angular positions of radial arms 162 and 164 are provided so that the relative pivotal positions of the respective turning wing sections 38 may be initially correlated.

The change in center of graivty of the aircraft and center of aerodynamic pressure of the wing resulting from change in sweepback are compensated for by adjustment of trim tabs 32.

It will be appreciated that, because of the effect of dynamic pressure on the wings, the mechanical linkage above described must provide sufficient mechanical advantage so as not to exceed or even place an undue requirement on the physical strength of the average pilot. In high speed aircraft it becomes increasingly difficult to provide this mechanical advantage and therefore, resort may be had to low-ratio gearing, for example, a worm and worm gear drive may be provided to turn shaft 160. Such gearing may also be provided in conjunction with the straight mechanical linkage described above in order to allow for fine adjustment.

Also within the scope of the invention, electric or hydraulic motors may be used to turn the coordinating shaft 160, further facilitating adjustment of sweepback.

If desired, the sweepback of wing sections 38 may be rendered automatically self-adjusting in response to airspeed. To this end, a spring or hydraulic system can be operatively connected normally to maintain coordinating rod in a position corresponding to a fully extended wing position at airspeeds below a preselected minimum, for example, 90 miles per hour. Above this speed the system would allow the dynamic pressure of the air to gradually and progressively move the wing sections rearwardly in proportion as the speed of the aircraft increased until at a second predetermined speed, for example, 150 miles per hour, the turning wing sections would reach a maximum sweepback.

It is pointed out that, with such an automatic control system, differences in dynamic pressure on the respective wings such as would be encountered when making turns would be equalized by the coordinating shaft so that both wing sections 38 would assume the same position at any given speed.

*Ailerons and aileron control linkage*

The vernontagrade wing, because of its variable sweepback, includes a novel aileron configuration which gives approximately the same amount of control effectiveness regardless of the position of the turning wing section and a novel aileron actuating linkage which requires no adjustment and is unaffected in its operation by variation to the sweepback angle.

As best appears in Figure 1, ailerons 182, provided at the outboard ends of wing sections 38, are pivotally secured thereto along a hinge line 184 disposed at an angle of about 45° to the vertical plane of symmetry of the aircraft fuselage 22 so that the free edges of the ailerons are comprised of approximately equal portions of the wing tip 48 and trailing edge 44. Constructed in this manner, the ailerons retain their effectiveness in all sweepback angles whereas, with conventional ailerons, viz., those hinged along a line substantially parallel to the spanwise axis of the wing, aileron control effectiveness would decrease with increasing sweepback angles until, at 90°, ailerons control would almost completely be lost.

Referring to Figure 2, the control linkage for ailerons 182 comprises the usual control stick 186 or equivalent device which is connected for lateral pivotal movement to the forward end of a torque rod 188 having a cross-arm 190 secured to its opposite end so that side to side movement of the control stick rotates the torque rod and cross-arm about the longitudinal axis of the former in the usual manner well known in the art. Control cables 192 and 194 connected to the opposite ends of cross arm 190 run over pulleys 196 and connect with the longer base corners 197 of a pivot plate 198 in the shape of an isosceles trapezoid pivoted midway on the longer base as at 199 for rotation about an axis substantially perpendicular to the plane of base wing 36. Control rods 200 and 202, pivotally connected at their inner ends to the respective short base corners 201 of plate 198, extend outwardly in opposite directions into the starboard and port spans of base wing 36.

The outboard ends of aileron control rods 200 and 202 extend into the respective hinge assemblies 66 between hinge disc pairs 100 and 102 and each is provided with a clevis 204 (one shown, Figures 4 and 5). Clevis 204 is disposed vertically between the inner ends of hinge pins 72 and 74 and when control stick 186 is laterally centered, has its pivotal axis coincident with the hinge axis 40 defined by the hinge pins. A bell crank 206 is mounted on the outboard side of radial rib 64a as by bracket 208, for pivotal movement about an axis parallel to hinge axis 40. The end of one arm of bell crank 206 extends into hinge assembly 66 and is there pivotally connected to clevis 204 by a clevis pin taking the form of a nut and bolt assembly 210 assembled by use of suitable tools inserted through the hollow hinge pins. The other arm of bell crank 206 is pivotally connected as by a pin and clevis assembly 212 to the inboard end of an aileron control rod 214 which extends outwardly into the port-side turning wing 38. A similar control rod 216 is provided for the starboard aileron.

The outboard ends of control rods 214 and 216 are pivotally connected to suitable bell crank plates 218 pivotally mounted adjacent the respective hinge lines 184 of ailerons 182. Short push rods 220, pivotally connected at one end to the arm of bell crank plates 218 opposite rods 214, have their opposite ends pivotally connected to the respective ailerons at points above the corresponding hinge lines 184, in the conventional manner.

The operation of the aileron control system is as follows: When control stick 186 is moved to the port side, torque bar 188 is rotated counter-clockwise (as viewed from the rear) pulling cable 192 downwardly and turning pivot plate 198 clockwise (as viewed from above).

In turning clockwise, pivot plate 198 moves control rod 202 outboard, pivoting bell crank 206 clockwise (viewed from above) pulling rod 214 inboard causing bell crank 218 to pivot clockwise, thus raising the port aileron 182. The action of the corresponding starboard elements of the aileron control system is simultaneous with but reversed from the port side so that the starboard aileron is lowered, thus causing the aircraft to bank to the left. For a right bank, the control stick 186 is moved to the right, causing the aileron control system to react oppositely from the manner just described. It will be noted that, because the arcuate path described by axes of the pivotal connections between bell cranks 206 and the respective control rods 200 and 202 passes through the axes 40 of the corresponding hinge assemblies 66, the effective lengths of rods 200, 202, 214 and 216 are not changed when the wing sections 38 are turned. Thus, the operating characteristics of aileron control system remain constant throughout the range of adjustability of the turning wing sections.

From the foregoing description of the invention it will be appreciated that, as examples of the advantages obtainable therewith, the V-wing can be used to give light aircraft greater stability over a wider range of operating speeds such as from 35–40 m.p.h. stalling speed to 200–400 m.p.h. maximum cruising speed; in a transport or cargo plane, the V-wing makes it possible to carry heavier payloads, use shorter landing and take-off runs, land at speeds as low as 90 m.p.h. and cruise at speeds exceeding 500 m.p.h.; in military fighters and bombers, the invention permits shorter take-off runs with larger loads of fuel and armament, operate safely at speeds far below and beyond the sonic "wall" and land at relatively low speeds.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An aircraft supporting wing comprising an intermediate inboard span adapted to be mounted on an aircraft fuselage providing oppositely directed base wing sections at opposite sides of the fuselage, the respective wing sections having spanwise extending forward, center and rear spars and the outboard ends of the forward and center spars being bifurcated to define recess openings adequate to accommodate passage of an adjacent telescoping attachment portion of an outboard turning wing span; a pair of outboard wing spans each having an inboard end pivotally connected at its trailing edge to the outer bifurcated ends of a respective one of said center spars for pivotal movement about respective parallel axes substantially perpendicular to the plane of its respective base wing section, said inboard ends of said outboard wing spans being formed to telescope within the outboard end recess openings of said base wing sections; and coacting means spaced radially outward of said trailing edge pivot connections and respectively contained within the respective ends of said telescoping portions of said inboard and outboard wing spans for guiding and supporting said telescoping portions of the respective outboard wing span in all operative positions thereof, said pivotal connections and said respective coacting means supportingly securing said outboard wing spans to said base wing sections for respective controlled swinging movement.

2. An aircraft supporting wing according to claim 1 wherein the aggregate length of said outboard spans when disposed in aligned relation to said inboard span is approximately equal to the length of said intermediate span.

3. In an aircraft, a supporting wing assembly comprising an intermediate inboard supporting span mounted on the fuselage of said aircraft, said span having a structural frame including chordwise extending forming ribs and a number of spanwise extending spars one of which is disposed adjacent the trailing edge of said inboard span, said span being open at both ends, a hinge assembly having hinge parts fixed and movable relative to said inboard span, the fixed parts of said hinge assembly being mounted on the outer ends of at least said one spar; a pair of outboard spans each comprising a leading edge, trailing edge, and a wing tip, the inboard end of said leading edge being curved in a circular arc of about 90° about a center adjacent the trailing edge of the outboard span, each of said outboard spans comprising a frame including a number of radial ribs extending from spaced points on the arcuate portion of said leading edge to the center of curvature thereof where they are fixedly secured to the movable parts of said hinge assembly whereby said outboard spans are pivotally mounted on the ends of said inboard span, the outboard ends of said inboard span being adapted to accommodate telescoping movement of the portion of said outboard spans bounded by the arcuate leading edge portion into and out of the open ends of said inboard span; and coacting means contained entirely within the open ends of said inboard span and within said outboard span for guiding and supporting the telescoping portion of said outboard spans relative to said inboard span.

4. An aircraft supporting wing comprising an intermediate inboard span adapted to be operatively mounted on an aircraft fuselage and a pair of outboard spans, a hinge assembly connecting each of said outboard spans to a respective end of said inboard span for pivotal movement about parallel axes perpendicular to the plane of said wing, ailerons on said outboard spans, control mechanism extending through said spans and operatively connected to actuate said ailerons, said hinge assembly having hinge members fixed and movable relative to said inboard span, said movable hinge members comprising a plurality of parallel, concentrically disposed hinge discs arranged in pairs and having coaxially aligned circular apertures therein, means fixedly connecting said discs to internal structural parts of said outboard spans, said fixed hinge members comprising parallel flat plates rigidly connected to internal structural parts of said inboard span and each extending between adjacent pairs of said hinge discs, said plates having circular apertures therein coaxially aligned with the apertures in said discs and defining said axis of pivotal movement, a hinge pin snugly received in the aperture of at least one fixed hinge member and extending loosely through the associated movable hinge members, a second hinge pin snugly received in the apertures of the remaining fixed hinge members and extending loosely through the movable hinge members associated therewith, the adjacent ends of said hinge pins being axially spaced to provide operating clearance therebetween for portions of said aileron control mechanism, and anti-friction means disposed around said hinge pins and within the apertures in said hinge discs to freely rotatably mount said movable hinge members on said hinge pins.

5. The aircraft supporting wing assembly defined in claim 4, said aileron control mechanism including oppositely directed control rods extending substantially spanwise through said intermediate span and a control rod individual to each of said outboard spans, a pair of bell cranks each having one arm pivotally connected to the inner end of the control rod in the corresponding outboard span and a second arm pivotally connected to the outer end of the corresponding control rod in the intermediate span, each of said bells cranks being mounted on an outboard span adjacent the respective hinge assembly for pivotal movement about an axis parallel to the axis of said hinge assembly, each said bell crank being so constructed and arranged that the pivotal connection between its said second arm and the outer end of the control rod in the corresponding inboard span is confined to an arcuate path of movement around the bell crank mounting axis and passing through said hinge assembly axis in all relative positions of the inboard and outboard span, as permitted by the clearance space between the inner ends of said hinge pins.

6. The aircraft supporting wing defined in claim 5 wherein said hinge pins are hollow so as to provide access to said pivotal connection.

7. An aircraft supporting wing comprising an intermediate span terminating in laterally open ends and having a structural frame comprising at least one spanwise extending spar disposed adjacent the trailing edge of said intermediate span with its respective opposite ends terminating adjacent said span ends; a hinge assembly having fixed hinge parts and movable hinge parts mounted on each of the ends of said one spar; a pair of outboard spans each having an inboard end curved in a circular arc of about 90° about a center located adjacent the the inboard end of the trailing edge, a structural frame comprising a plurality of radial ribs extending from spaced points on the arcuate portion of said inboard end toward the center of curvature thereof and terminating in ends fixedly secured to the movable hinge parts to pivotally secure said outboard spans to said intermediate span and define an inboard end for telescopic cooperation with said ends of said intermediate span; and coacting guide and support means contained within the respective ends of said intermediate and outboard spans for guiding and supporting the telescoping end of said outboard spans comprising respective arcuate tracks fixedly mounted on the frame of said inboard span adjacent its ends, respective arcuate tracks mounted within the respective outboard spans, said tracks having complimentary curvatures of equal radii and common centers coinciding with the pivotal axis of the respective hinge assemblies, and roller means on each of said tracks in rolling contact with the other of said tracks.

8. An aircraft supporting wing comprising intermediate inboard span adapted to be mounted on an aircraft fuselage; a pair of outboard spans having inboard ends adapted to respectively telescope into the outboard ends of said inboard span; respective pivot means for securing each outboard span to a respective outboard end of said intermediate span for pivotal movement to and from selected positions between a first limit position in which said spans are aligned and a second limit position in which said outboard spans are at substantially right angles to said intermediate span, said pivotal movement being about respective axes located adjacent the trailing edges of said wing; coacting guide and support means spaced radially outwardly from said pivot means spaced radially outwardly from said pivot means and respectively contained within the respective pivotally connected ends of said inboard and outboard spans for telescopingly guiding and supporting the respective relatively swinging inboard ends of said outboard spans relative to the respective outboard ends of said inboard span; an aileron on each of said outboard spans; and means for operating said ailerons including a respective bell crank pivotally mounted on an inboard portion of each of said outboard spans for rocking movement relative thereto about an axis which is parallel to the pivotal axes of said outboard spans and which during movement of its respective outboard span, follows an arcuate path having the pivotal axis of its respective outboard span as its center, linkage means operatively connecting one arm of each bell crank and its respective aileron for elevating and depressing the latter in response to rocking movement of its bell crank, respective control rods pivotally connected at one end to the other arm of each bell crank, the pivotal connection therebetween being at a fixed distance from the pivot mounting of said respective bell cranks on said inboard portion of each of said outboard spans to assure that the respective control rod pivotal connections in all relative positions of the inboard and outboard spans lie along an arcuate path the center of which coincides with the pivot axis of its respective bell crank and the radius of which is equal to the distance between the bell crank pivot axis and the pivotal axis of its respective outboard span, and means connected to the opposite ends of said control rods selectively operable to impart simultaneous, equal and opposite axial movement to the respective control rods for adjusting said ailerons.

References Cited in the file of this patent

UNITED STATES PATENTS

| | | |
|---|---|---|
| 1,793,349 | Andersson | Feb. 17, 1931 |
| 2,316,885 | Artega | Apr. 20, 1943 |
| 2,699,300 | Trotter et al. | Jan. 11, 1955 |
| 2,794,608 | Johnson | June 4, 1957 |

FOREIGN PATENTS

| | | |
|---|---|---|
| 416,109 | Italy | Nov. 18, 1946 |
| 524,864 | Great Britain | Feb. 7, 1940 |
| 923,988 | France | Mar. 3, 1947 |